April 27, 1926.
E. A. MOYER
THREAD MILLING ATTACHMENT
Filed Oct. 24, 1923    2 Sheets-Sheet 1
1,582,852
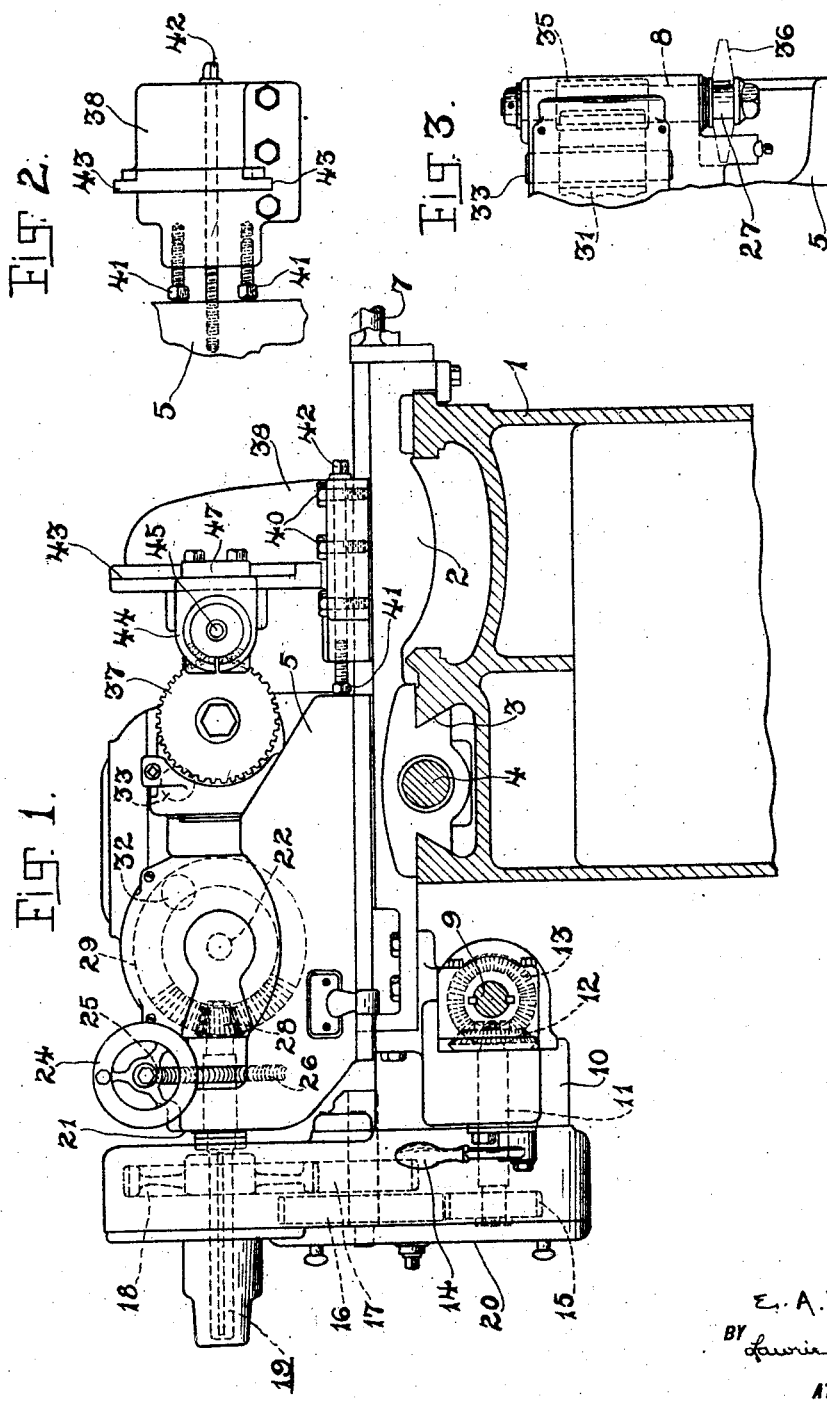
INVENTOR
E. A. Moyer.
BY
ATTORNEY

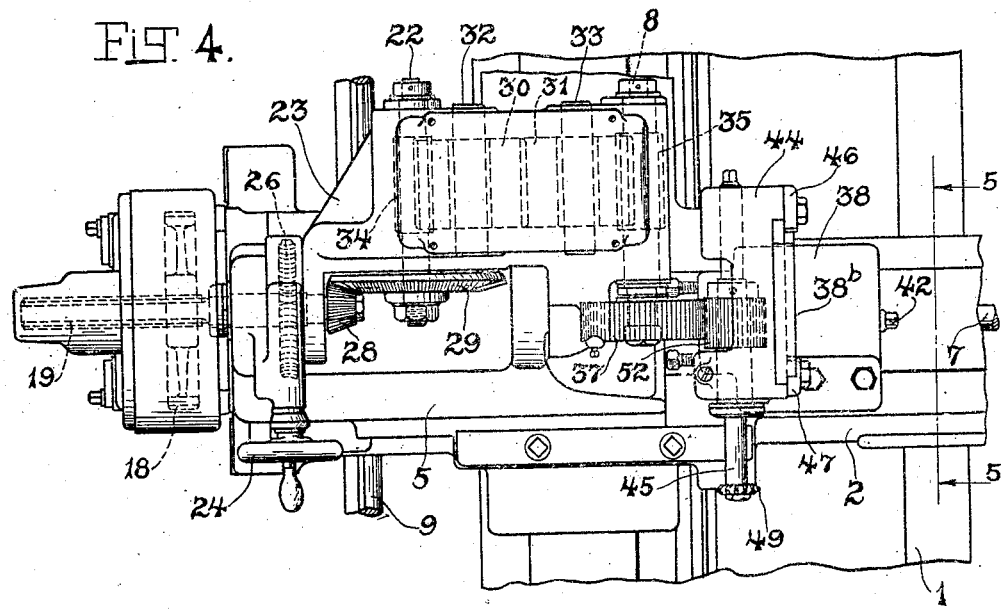
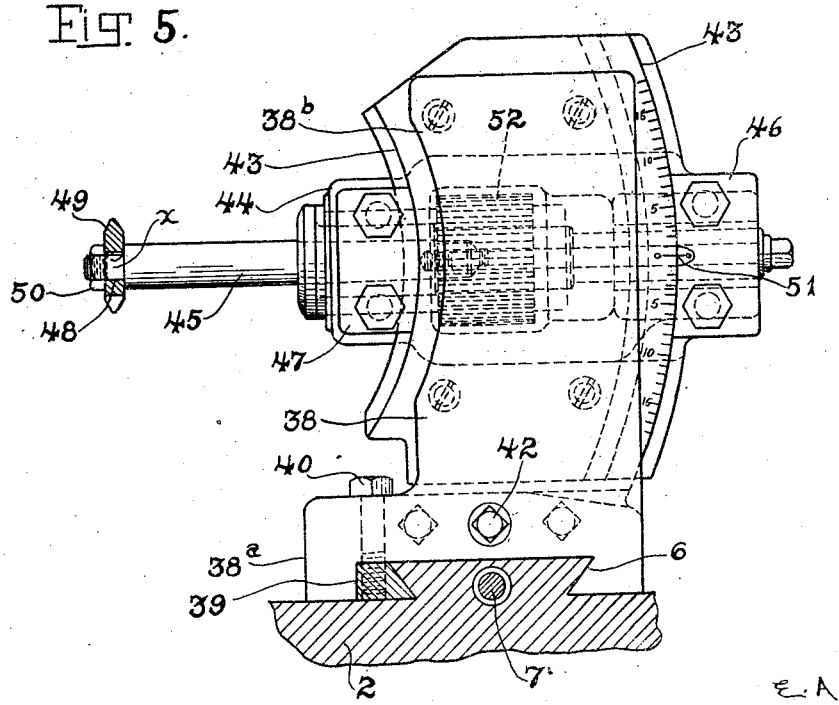

Patented Apr. 27, 1926.

1,582,852

UNITED STATES PATENT OFFICE.

EDWARD A. MOYER, OF WEST HARTFORD, CONNECTICUT, ASSIGNOR TO PRATT & WHITNEY COMPANY, OF NEW YORK, N. Y., A CORPORATION OF NEW JERSEY.

THREAD-MILLING ATTACHMENT.

Application filed October 24, 1923. Serial No. 670,525.

*To all whom it may concern:*

Be it known that I, EDWARD A. MOYER, a citizen of the United States, residing at West Hartford, in the county of Hartford and State of Connecticut, have invented certain new and useful Improvements in Thread-Milling Attachments, of which the following is a specification.

This invention relates to thread milling machines and particularly to an improved attachment for milling internal threads. In my application Serial No. 583,397, filed August 21, 1922 is disclosed an improved thread milling machine for milling external threads. It is very frequently desired to mill internal threads and the primary object of this invention is to provide an improved attachment for performing such operation, the attachment as illustrated being adapted to be used in connection with my above mentioned thread milling machine.

It is an object of the invention to provide an improved attachment for milling internal threads, including an auxiliary tool spindle support adapted to be mounted on the cutter carriage of a thread milling machine adjacent the main tool spindle slide, means for adjusting the auxiliary spindle angularly in accordance with the pitch of the thread to be cut, means for driving the auxiliary tool spindle from the main tool spindle, and means to secure the support against movement relative to the main tool slide.

With the above and other objects in view, my invention consists in the features of construction and operation set forth in the following specification and illustrated in the accompanying drawings. In such drawings annexed hereto and forming a part of this specification, I have shown one embodiment of my invention but it will be understood that the invention can be otherwise embodied and that the drawings are not to be construed as defining or limiting the scope of the invention, the claims appended to this specification being relied upon for that purpose.

Referring to the figures of the drawings:

Figure 1 is a transverse sectional view through the bed of a thread milling machine having my improved attachment mounted on the tool carriage adjacent the main tool slide thereon.

Fig. 2 is a fragmentary plan view thereof, certain parts being omitted.

Fig. 3 is a fragmentary plan view showing a portion of the machine comprised in my above mentioned application.

Fig. 4 is an enlarged fragmentary plan view of the mechanism shown in Fig. 1.

Fig. 5 is an enlarged front view of my attachment as seen from line 5—5 on Fig. 4.

Referring more specifically to the drawings by reference characters, 1 indicates the bed of a thread milling machine having a tool carriage 2 slidably mounted in a guideway 3 therein, a screw 4 being provided for moving the carriage therealong. A tool slide 5 is movable on a transversely extending guideway 6 on the carriage, a screw 7 being provided for so moving the slide.

Rotatably mounted in the slide 5 is a tool spindle 8 which is adapted to be driven from a main shaft 9 through the following mechanism: Carried by a depending portion 10 of the carriage 2 is a shaft 11 having a bevel gear 12 thereon. Two bevel gears 13 are splined to the shaft 9 and carried by the portion 10 respectively at opposite sides of the bevel gear 12. A handle 14 is provided for shifting either of these gears 13 into mesh with the gear 12 for driving the shaft 11 in either direction from the shaft 9. This mechanism is fully disclosed in my said copending application.

A gear 15 on the shaft 11 operates through gears 16, 17 and 18 to drive a shaft 19 splined to slide in the gear 18. The gears 15 and 16 provide change speed gears within the gear box 20 whereby the spindle speed may be varied. The shaft 19 is mounted in bearings 21 in the tool slide 5 and such shaft is free to slide within the gear 18 as the slide 5 is moved on the carriage 2.

The cutter spindle 8 and a parallel driving shaft 22 therefor are mounted in a bracket 23 adjustable about the shaft 19 as an axis. Such adjustment is accomplished by rotating a hand wheel 24 carried by the slide and connected to a worm 25 in mesh with a worm wheel 26 secured to the bracket 23. The spindle 8 is adapted to support a cutter thereon at 27 and the axial line of shaft 19 extends through this portion of the spindle. The hand wheel 24 therefore serves to adjust the spindle laterally about the cutter carrying portion 27 as a center. A bevel pinion 28 on the shaft 19 is in mesh with a bevel gear 29 on the shaft 22 and a pair of gears 30 and 31 respectively mounted on shafts 32 and 33 and meshing with pinions 34 and 35 operatively connect the shaft 22 with the spindle.

In Fig. 3, I have shown the spindle 8 as provided with a milling cutter 36 of the usual form for milling external threads. In Figs. 1, 4 and 5 of the drawings, I have illustrated a driving gear 37 as substituted for the cutter 36. The function of such gear will hereinafter appear.

It should be understood that the mechanism thus far described is that shown in my aforesaid application. Such mechanism and its operation are more fully disclosed in such application. Such machine is adapted to mill threads on the exterior surfaces of work pieces. The invention disclosed herein is an attachment for milling threads on the interior surfaces of work pieces, such attachment being adapted to be mounted on and supported by the said machine. This attachment will now be described.

An auxiliary tool support 38 is provided with a base 38$^a$ and an upright portion 38$^b$. The base is formed to fit the tool slide receiving guideway 6 on the carriage 2. The support can be secured to the guideway by means of a gib 39 engaged by a plurality of screws 40. A plurality of screws 41 and 42 are also provided for adjustably securing the support to the slide 5. Screws 41 are screw threaded into the support and the heads thereof are adapted to abut against the slide. The screw 42 extends loosely through the support and screw threads into the slide. These screws serve to adjustably and rigidly connect the support to the slide.

The edges 43 of the upwardly extending portion 38$^b$ of the support are curved to form an arcuate guideway for receiving a spindle bearing 44. This bearing rotatably supports an auxiliary tool spindle 45 therein. Plates 46 and 47 are provided for rigidly securing the bearing to the flanges 43 of the guideway. The spindle is provided with a cutter carrying portion 48 on which a milling cutter 49 is secured by means of a nut 50. The center of the arcuate guideway 43 is at the center $x$ of the cutter 49 whereby the spindle may be adjusted laterally about the cutter carrying portion 48 as a center. Any lateral adjustment of the bearing 44 on its support therefore functions only to move the cutter angularly about its center and does not move such cutter bodily. The function of such adjustment is to set the cutter at an angle corresponding to the helix angle of the thread it is desired to mill. The bearing and upright are provided with cooperating indicia marks 51 for making such adjustment accurately.

The auxiliary spindle 45 is adapted to be rotated from the main spindle 8. As illustrated, a gear 52 mounted on the spindle 45 is adapted to mesh with the before mentioned gear 37 whereby to rotate the spindle 45.

In operation, the screws 40 and 42 are loosened to permit the support 38 to separate from the slide 5 sufficiently to disengage the gear 52 from the gear 37. The bearing 44 is then adjusted on its support to place the spindle 45 and cutter 49 at the desired cutting angle. The hand wheel 24 is then rotated to place the spindle 8 at the same angle whereby the two spindles will be parallel. The support is then moved toward the slide to mesh the gear 52 with the gear 37. The screws 41 and 42 are then adjusted to secure the support rigidly to the slide in such position. Rotation of the screw 7 will now function to move the slide 5 and the support 38 on the carriage as a unit. Rotation of the screw 7 is therefore adapted to move the cutter 49 laterally to engage the same with the work. The cutter is moved longitudinally of the machine, both for positioning and for obtaining the lead of the thread being cut, by rotation of the screw 4 in the usual manner. The support 38 can be secured rigidly to the carriage 2 if desired by tightening the screws 40.

What I claim is:

1. An attachment for thread milling machines for milling internal threads comprising in combination, a support adapted to be mounted on a carriage of a thread milling machine adjacent a tool supporting slide thereon, a tool spindle carried by the support, means for operatively connecting the said spindle with a tool spindle on the tool slide, and means for connecting the support to a movable part on the said machine.

2. An attachment for thread milling machines for milling internal threads comprising in combination, a support adapted to be mounted on a carriage of a thread milling machine adjacent a tool supporting slide thereon, a tool spindle carried by the support, a gear on the said tool spindle adapted to mesh with a gear on a tool spindle on the tool slide and means for securing the support against movement relative to the tool slide.

3. An attachment for thread milling machines for milling internal threads comprising in combination, a support having a base formed to fit a tool slide receiving guideway on a carriage of a thread milling machine, a tool spindle rotatable in the support, means on the spindle adapted for rotatably connecting the same with a tool spindle on the tool slide, and means for rigidly connecting the support to the tool slide.

4. An attachment for thread milling machines for milling internal threads comprising in combination, a support adapted to be mounted on a carriage of a thread milling machine adjacent a tool supporting slide thereon, a tool spindle rotatable in the support and having a cutter carrying portion thereon, means on the spindle adapted for rotatably connecting the same with a main tool spindle on the tool slide, means for adjusting the spindle laterally about the said cutter carrying portion as a center, and means for securing the support against movement relative to the tool slide.

5. An attachment for thread milling machines for milling internal threads comprising in combination, a support adapted to be mounted on a carriage of the thread milling machine adjacent a tool supporting slide thereon, a spindle bearing mounted on a curved guideway on the support, a tool spindle rotatable in the bearing and having a cutter carrying portion adjacent one end thereof, the bearing being adjustable in its curved guideway about the said cutter carrying portion of the spindle as a center, means on the spindle for rotatably connecting the same with a tool spindle on the tool slide, and means for securing the support against movement relative to the tool slide.

6. An attachment for thread milling machines for milling internal threads comprising in combination, a support having a base formed to fit a tool slide receiving guideway on a carriage of the thread milling machine, a tool spindle rotatable in the support and having a cutter carrying portion thereon, means on the spindle for rotatably connecting the same with a main tool spindle on the tool slide, means for adjusting the spindle laterally about the said cutter carrying portion as a center, and screw threaded means for adjustably securing the support to the tool slide.

7. An attachment for thread milling machines for milling internal threads comprising in combination, a support having a base formed to fit a tool slide receiving guideway on a carriage of a thread milling machine, a spindle bearing mounted on a curved guideway on the support, a tool spindle rotatable in the bearing and having a cutter carrying portion adjacent one end thereof, the bearing being adjustable in its curved guideway about the said cutter carrying portion of the spindle as a center, a gear on the spindle adapted to mesh with a gear on a tool spindle on the tool slide, and means for rigidly securing the support to the slide.

8. In a thread milling machine, the combination of a cutter carriage, a tool slide mounted on a guideway thereon, a tool spindle rotatably mounted in the slide, an auxiliary tool support mounted on the guideway adjacent the slide, a tool spindle in the auxiliary support, means operatively connecting the tool spindles whereby the first said spindle rotates the second named spindle, and means for securing the support against movement relative to the slide.

9. In a thread milling machine, the combination of a cutter carriage, a tool slide mounted thereon, a tool spindle rotatably mounted in the slide, an auxiliary tool support mounted on the carriage adjacent the slide, a spindle in the auxiliary support having a cutter carrying portion thereon, means for adjusting the second named spindle laterally about the said cutter carrying portion as a center, means for laterally adjusting the first named spindle to correspond therewith, means adapted to operatively connect the spindles, and means for securing the support against movement relative to the slide.

10. In a thread milling machine, the combination of a cutter carriage, a tool slide mounted thereon, a spindle rotatably mounted in the slide and having a cutter carrying portion thereon, means for adjusting the spindle laterally about the said cutter carrying portion as a center, an auxiliary tool support mounted on the carriage adjacent the slide, a spindle in the auxiliary support having a cutter carrying portion thereon, a gear on the first spindle adapted to mesh with a gear on the second spindle for driving the latter, means for adjusting the second named spindle laterally about its said carrying portion as a center, and means for securing the support against movement relative to the slide.

11. In a thread milling machine, the combination of a cutter carriage, a tool slide mounted on a guideway thereon, means for moving the slide along the guideway, a tool spindle rotatably mounted in the slide, an auxiliary tool support mounted on the guideway adjacent the slide, a tool spindle in the auxiliary support having a cutter carrying portion thereon, means for adjusting the second named spindle laterally about the said cutter carrying portion as a center, means for adjusting the first named spindle laterally to correspond therewith, means adapted to operatively connect the spindles, and means for rigidly securing the support to the slide.

12. In a thread milling machine, the combination of a cutter carriage, a tool slide mounted thereon, a spindle rotatably mounted in the slide and having a cutter carrying portion thereon, means for adjusting the spindle laterally about the said cutter carrying portion as a center, an auxiliary tool support mounted on the carriage adjacent the slide, a spindle in the auxiliary support having a cutter carrying portion thereon, a gear on the cutter carrying portion of the first spindle adapted to mesh with a gear on the second spindle for driving the latter, means for adjusting the second named spindle laterally about its cutter carrying portion as a center, and screw threaded means for adjustably securing the support to the slide.

13. In a thread milling machine, the combination of a cutter carriage, a tool slide mounted thereon, means for rotatably supporting a tool spindle therein, means for rotating the spindle, an auxiliary tool support mounted on the carriage adjacent the slide, an auxiliary spindle in the support having a cutter carrying portion thereon, means for adjusting the auxiliary spindle laterally about the said cutter carrying portion as a center, means operatively connecting the auxiliary spindle to the second named means, and means for securing the support to the carriage.

In testimony whereof, I hereto affix my signature.

EDWARD A. MOYER.